United States Patent [19]

Ackeret

[11] 3,995,921
[45] Dec. 7, 1976

[54] HOLDERS FOR THE STORAGE OF TAPE CASSETTES

[75] Inventor: Peter Ackeret, Kusnacht, Switzerland

[73] Assignee: IDN Inventions and Development of Novelties AG, Lenzerheide, Switzerland

[22] Filed: May 30, 1975

[21] Appl. No.: 582,129

[30] Foreign Application Priority Data

June 5, 1974 Germany .......................... 2427106

[52] U.S. Cl. .............................. 312/12; 206/387; 312/319; 312/333
[51] Int. Cl.² ................... A47B 81/00; B65D 39/00
[58] Field of Search .............................. 312/12–19, 312/111, 199, 246, 333, 319; 211/41; 220/8; 206/DIG. 36, 387

[56] References Cited

UNITED STATES PATENTS

| 3,677,396 | 7/1972 | Stadr | 312/246 |
| 3,904,259 | 9/1975 | Hoffmann | 312/111 |
| 3,909,088 | 9/1975 | Dennghey et al. | 312/12 |

*Primary Examiner*—Casmir A. Nunberg
*Attorney, Agent, or Firm*—H. Dale Palmatier

[57] ABSTRACT

A holder for tape cassettes and having a thin and flat housing and one narrow side through which the cassette is inserted. A leaf spring in the housing to thrust the cassette outwardly through the entrance, the leaf spring being arranged to be retained in the housing in flexed condition and essentially locked in tensioned position, and a spring-pressed element retaining the cassette in the housing adjacent the tensioned ejection member or spring.

11 Claims, 14 Drawing Figures

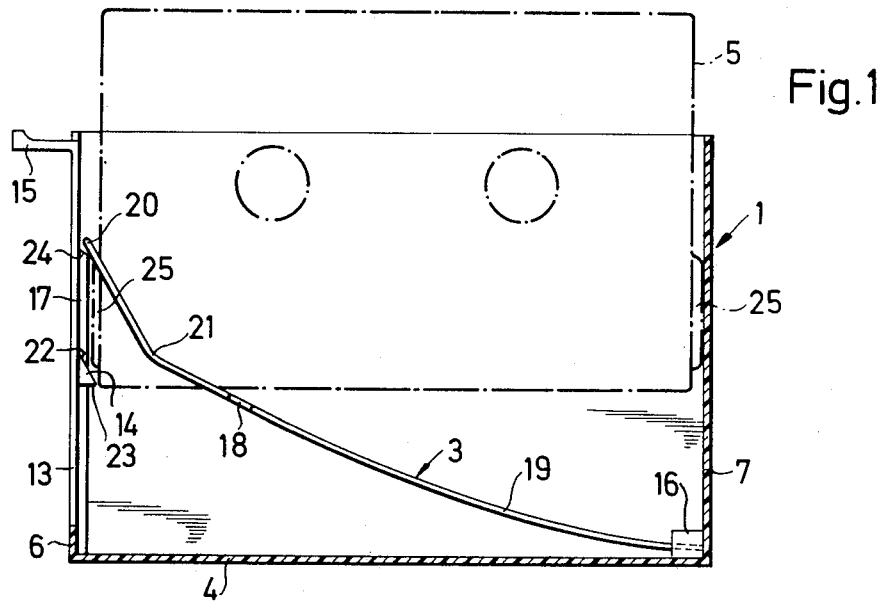
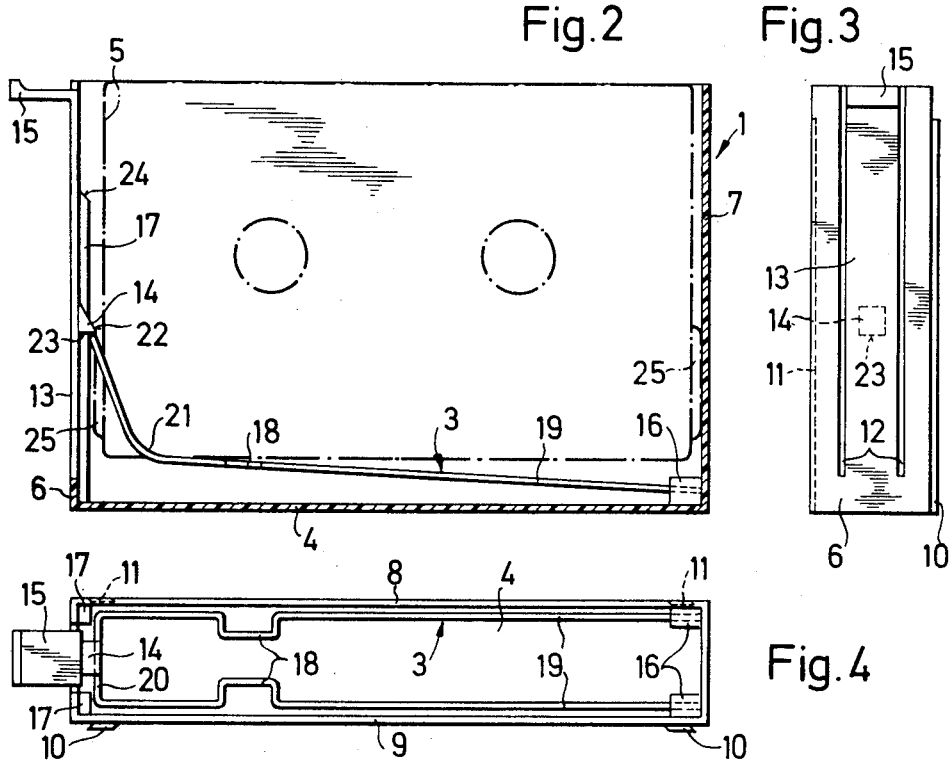

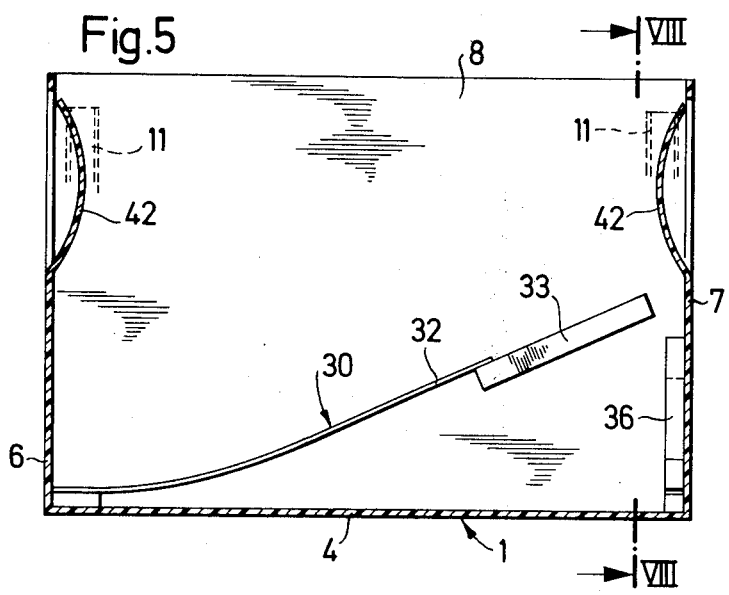
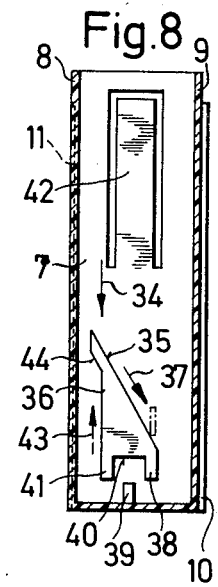
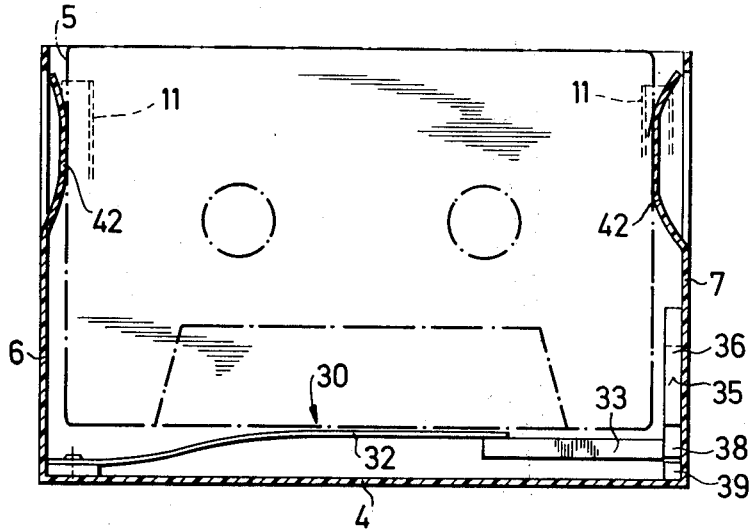
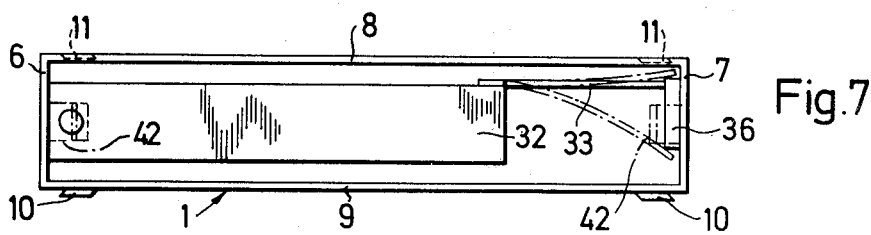

HOLDERS FOR THE STORAGE OF TAPE CASSETTES

The invention relates to holders for the storage of tape cassettes, for example magnetic tape cassettes, and the like, comprising a rectangular housing which has an entrance on one of its narrow sides for the insertion of the cassette and wherein the cassette is movable into a convenient removal position by means of an ejection spring tensioned by the insertion movement of the cassette when a locking device and the spring is released.

Holders of that type are known and are constructed after the manner of a drawer, and the cassette is inserted into a slider which is subjected to pre-tension by the ejector member. When the locking device is released, the slider slides with the cassette out of the housing and is arrested by stops. Several such containers may be positively joined to form stacking blocks, and the tape coils of the cassette may be secured by means of cams or the like which are moulded onto the slider.

The object of the invention is to provide a holder of lower manufacturing costs than known holders.

This object is fulfilled according to the invention by the fact that the ejection spring is so constructed and arranged in the housing that when the cassette is pushed in the ejection spring locks itself automatically with parts of the housing in its tensioned end position.

In particularly advantageous embodiments of the invention, the ejection spring at the same time takes over the function of clamping the cassette in its storage position. With a few uncomplicated parts it is thereby possible to create a cassette holder wherein the cassette is conveyed by means of a slight finger pressure into a convenient removal position, thus offering the advantage of one-hand operation.

By way of example only embodiments of the invention will now be described in greater detail with reference to the accompanying drawings of which:

FIGS. 1 and 2 show a first embodiment of the invention in longitudinal section parallel to one of the large cassette surfaces with the individual parts in the position in which the cassette is ready for removal (FIG. 1) and is stored (FIG. 2).

FIG. 3 is a side view of the holder, seen in the direction of the arrow 3 in FIG. 2, FIG. 4 is a view into the inside of the holder with the cassette removed.

FIG. 5 is a longitudinal section through a second embodiment of the invention,

Figure 9:
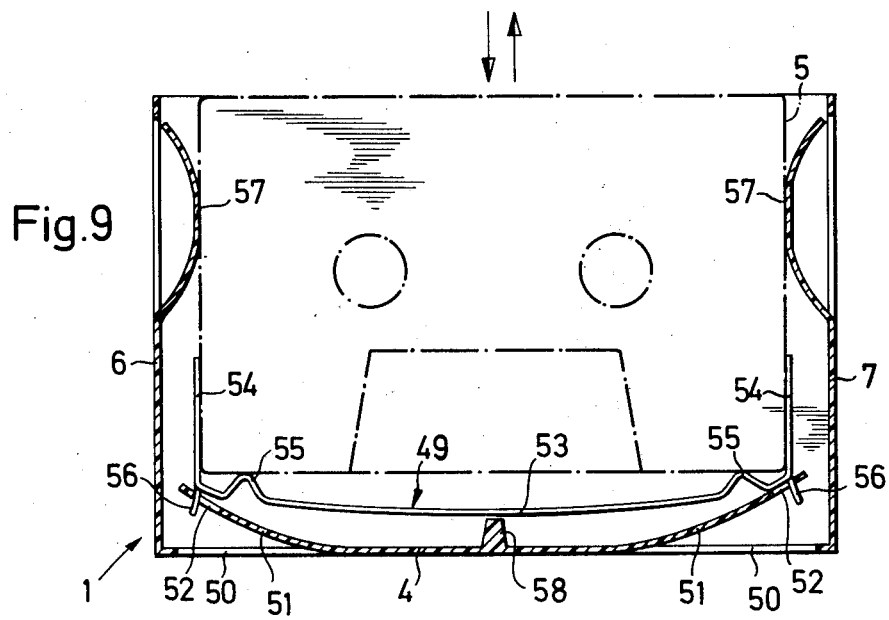
Figure 10:
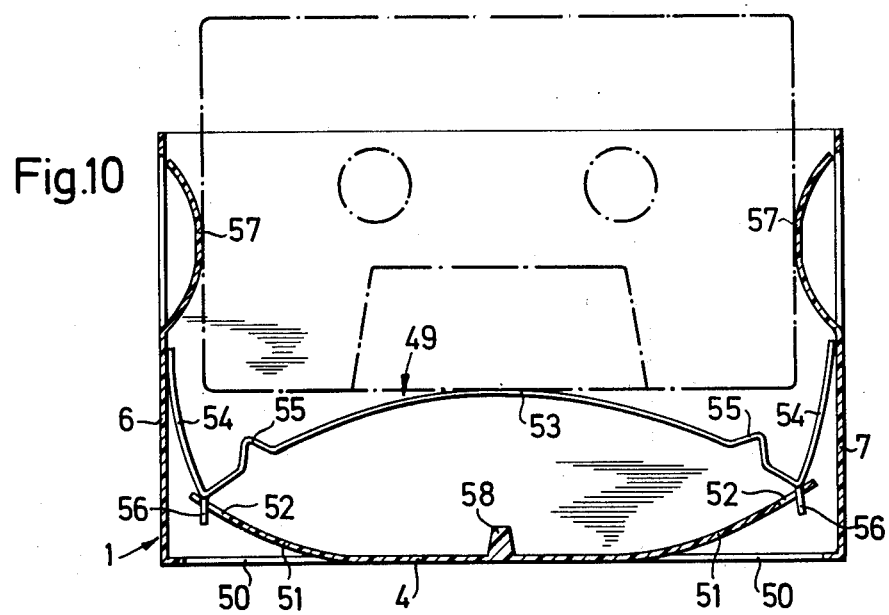
Figure 11:
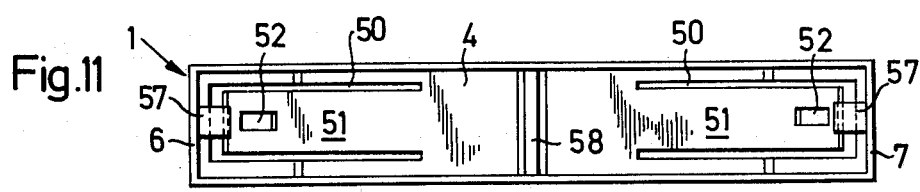
Figure 13:
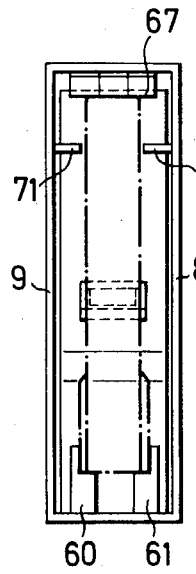
Figure 12:
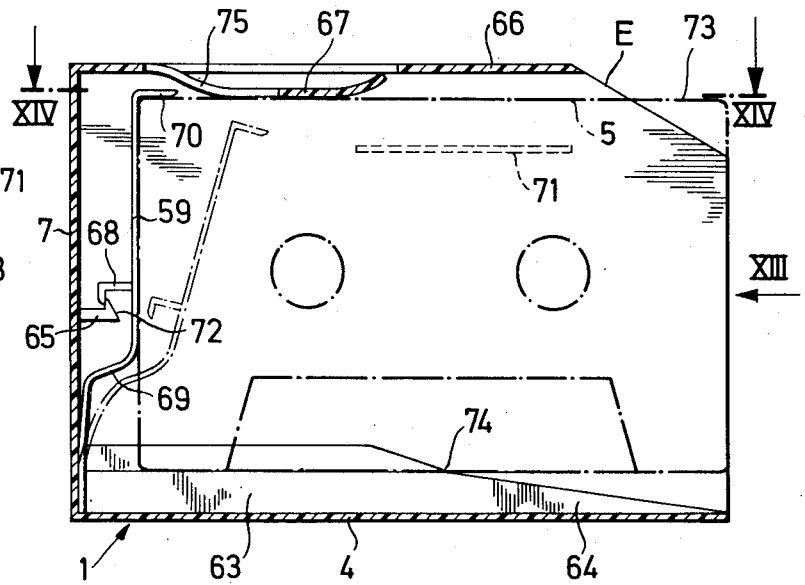
Figure 14:
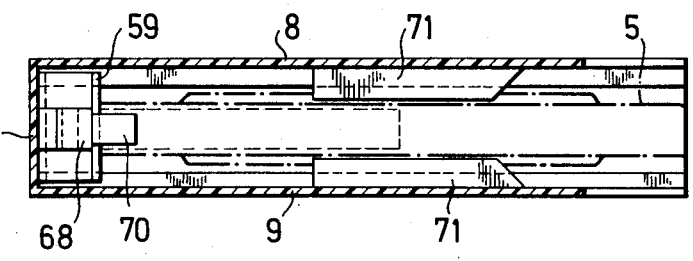

FIG. 6 shows in a similar manner to FIG. 5 the position of the parts with the cassette pushed in, FIG. 7 is a plan view of the ejection spring in its holding position, but with the cassette removed, FIG. 8 is a section along the line IV—IV in FIG. 5, FIG. 9 is a longitudinal section through a third embodiment of the invention, with the cassette pushed in, FIG. 10 shows the container in a similar manner to FIG. 9 but with the cassette ready for removal, FIG. 11 is a plan view of the base of the holder from inside, (without spring), FIG. 12 is a longitudinal section through a fourth embodiment of the invention with the cassette pushed in, FIG. 13 shows a side view in the direction of the arrow VIII of the holder shown in FIG. 12, FIG. 14 is a section along the line XIV—XIV in FIG. 12.

The holder comprises a rectangular housing 1 which has an entrance along one of its narrow sides through which the cassette is inserted, and has a base 4, end walls 6, 7 and side walls 8, 9. Moulded onto the side walls 8, 9 there are respectively strips 10 and dovetail cross-section or grooves 11 corresponding thereto, which allow several similar holders to be stacked together.

In the embodiment shown in FIGS. 1 to 4 there is moulded into the angle between base 4 and end wall 7 of the housing 1 made of a plastics material a retaining means 16 for a curved spring 3 made of spring steel wire. The opposite end wall 6 has two slots 12 parallel to the side walls 8, 9 so that a flexibly deformable tongue 13 is produced. The tongue 13 has moulded onto it a laterally projecting key 15 and a lug 14. Finally, the end wall 6 is provided on both sides of the tongue 13 with stiffening strips 17, which do not however project as far inside the holder as the tip of the lug 14.

The spring 3 is curved approximately in a U-shape (FIG. 4) and has inwardly facing sections 18. The shanks 19 of the spring are fixed in retaining means 16. The transverse section 20 of the spring 3 assumes the position shown in FIG. 1 above the stiffening strips 17 when the spring is released from tension; it is also apparent from this Figure that the spring has a nominal bending point 21 at which it preferably bends with respect to the U-plane.

If a cassette 5 is now pushed into the holder, it first meets the sections 18 of the spring, and as the cassette is pushed in further it deforms the latter in such a way that it is curved into the position shown in FIG. 2. The transverse section 20 of the spring thereby slides along the strips 17, which have oblique ramps 24, and the spring bends mainly at 21. Finally, the transverse section 20 of the spring comes within range of the oblique surface 22 on the lug 14, pushes the tongue 13 away in an outward direction and, on moving further downwards, allows the latter to spring back into its initial position.

If the cassette is now released, the transverse section 20 of the spring 3 catches on the impact surface 23 of the lug 14. The cassette is thereby simultaneously held since on the one hand the shank sections of the spring 3 between the sections 18 and the transverse section 20 of the spring 3 rest with slight pre-tensioning against the side faces of the cassette, and since on the other hand the transverse section 20 engages over one of the lateral guide ribs 25 present on the cassettes.

A slight pressure on the key 15 suffices to remove the cassette. The lug 14 then frees the spring 3 at its transverse section 20, and the spring being released from tension pushes the cassette 5 out with the sections 18. Due to the fact that the spring shank sections rest against the cassette as mentioned above, the latter is not catapulted out but is held in the position shown in FIG. 1. The locking at the rib 30 is eliminated, however, since the transverse section 20 of the spring 3 can now give way in the direction of the end wall 6.

In the embodiment shown in FIGS. 5 to 8, in the corner between base 4, end wall 6 and the side walls 8, 9 a leaf spring 30 is fixed, preferably riveted as shown. The spring 30 has a first, wide ejector section 32 which is resilient in the direction of movement of the cassette 5, and a second, narrower control section 33 which is resilient at right-angles to the first section. The sections together form a one-piece element.

The length of the spring 30 is such that the control section 33 projects with its free end into a slide guide which is moulded onto the inside of the narrow end wall 7. In the rest position, the spring 30 assumes the position shown in FIG. 5; the free end of the control section 33 is thereby situated approximately at the point of the arrow 34 in FIG. 8. If the spring 30 is now pressed downwards by the insertion of the cassette 5, the free end meets the oblique surface 35 of a slide 36 and is deflected in the direction of the side wall 9. When the cassette 5 is pushed in further, it follows the arrow 37 and reaches the position shown by dash-dotted lines in FIG. 8. When the cassette is finally pushed in completely against the pre-tensioning of the ejector section 32 of the spring, the free end of the control section 33 passes under the base section 38 of the slide 36, springs back, and comes to rest against the stop cam 39. If the cassette 5 is now released, the spring 30 pushes the cassette back a little under the influence of the force stored in the ejector section 32, so that the control section 33 is freed from the stop cam 39; however, since it now meets the stop surface 40 of the slide 36, the spring 30 cannot be further released from tension. The free end of the control section 33 of the spring 30 therefore comes to rest in the corner between the stop surface 40 and the base section 41 of the slide. This is the storage position. The cassette is thereby held by means of friction by two tongues 42 which are set out from the end walls 6, 7 and rest resiliently against the narrow sides of the cassette.

In order to remove the cassette it is sufficient to exert a slight inward pressure on the cassette towards the base 4. The control section 33 of the spring 30 is thereby pushed downwards along the base section 41, arrives behind the stop cam 39, and can now spring back into its untensioned position, flush with the arrow 43. If the cassette is now released, the spring 30 pushes it outwards, and the free end of the control section 33 follows the arrow 43, is deflected in the other direction on the deflecting path 44, and then returns again to the initial position according to FIG. 1. In FIG. 7 the insertion position of the spring 3 is indicated by solid lines, whilst the maximum deflections of the control section 33 are indicated by dash-dotted lines.

In the embodiment shown in FIGS. 9 to 11, the base 4 has two substantially U-shaped apertures 50, and the tongues 51 thus formed, are in turn provided with small rectangular apertures 52. In addition, the tongues 51, as can be seen from the Figures, are curved forwards into the inside of the housing 1.

Spring 49 is a leaf spring with a control section 53 arched towards the entrance of the holder and two symmetrically arranged lateral spring arms 54. Furthermore, the arched section 53 also has angled sections 55. Near the edge connecting the arched section with the lateral spring arm in question in each case, lugs 56 are set out from the spring which, as shown, are entered into the apertures 52 of the tongues 51.

When the spring 49 shown in FIG. 10 is inserted in the housing, the spring arms 54 rest with slight pre-tension against the end walls 6, 7, whilst the arched section is kept tensioned by being suspended between the two apertures 52. In this position the cassette 5 can be pushed in, and the lateral tongues 57 which project inwards from the end walls 6, 7 simultaneously effect the guiding and braking of the cassette.

If a slight pressure is now exerted on the cassette, the spring is depressed over its arched section 53 and the tongues 51 are pressed downwards. The spring arms 54 resting only with slight pre-tension against the end walls have already lifted away from the latter and then adopts the shape shown in FIG. 9.

As soon as the arched section is fully depressed, further slight pressure on the cassette leads to the position shown in FIG. 9; the arched section now points downwards and the spring arms 54 rest against the cassette so that the latter is held firmly. The spring thus acts as a "frog spring".

Slight pressure on the cassette in the direction of the base 4 suffices to remove the cassette. The latter presses on the lateral angled sections 55, whilst the arched section 53 of the spring rests in the centre on a stop 58 on the base 4 and is thus curved upwards beyond the dead-centre point. When the cassette is released it is therefore ejected, since the spring arms 54 bend away laterally and the arched central section 53 tends to return to the position shown in FIG. 10.

Securing means may be provided for the tape coils of the cassette in the usual manner, but are not shown here.

In the embodiment shown in FIGS. 12 to 14, the housing has substantially the shape of a box open on one of its narrow sides to form an entrance, and along a plane E a corner is cut away near the entrance.

On the inside of the base 4 there are two guide strips 60, 61 with sliding sections 63 parallel to the base and adjacent wedge sections 64 which taper towards the entrance.

A hook 65 is moulded onto the end wall 7 and near the base 4 a spring 59 is attached to the end wall 7. Finally the partly cut-away guide wall 66 has a punched-out, inward-springing tongue 67.

The spring 59 is made from a piece of spring steel strip, curved into the shape shown in FIG. 12; a lug 68 is punched out from the strip on a level with the hook 65 and angled in such a way that the spring lug 68 can be retained on the hook; in this position - which is shown in FIG. 12 - the spring is tensioned in the direction of the open side of the housing, but also in a downward direction towards the base 4, since the spring 59 has an approximately S-shaped curvature 69. A claw 70 is formed at the free end of the spring.

When the cassette 5 is pushed in along the guide strips 60, 61, the tongue 67 presses onto the opposite edge of the cassette and holds it approximately parallel to the base 4. Shortly before reaching its end position, the cassette meets the claw 70, since the spring 59 is free from the hook 65 and lies in front of the cassette in the untensioned rest position, which is shown by dash-dotted lines in FIG. 12. The cassette is guided and supported by means of vanes 71 which are moulded onto the side walls 8, 9 so that the cassette 5 and spring 59 are always flush with one another. If the cassette is now pushed in further, the lug 68 slides along the oblique surface 72 of the hook 65, so that the spring is tensioned and the claw 70 engages on the top edge of the cassette. Finally, the lug 68 drops over the hook 65, so that the claw 70 comes forcefully to rest on the cassette and holds the latter firmly. This is indicated by solid lines in FIG. 12.

In order to remove the cassette, pressure is exerted on the corner 73, which is accessible due to the fact that the corner of the housing is cut away, in the direction of the base 4. The cassette is thereby tilted about a fulcrum 74 which lies at the junction between the sliding section 63 and the wedge sections 64 of the guide strips 60, 61. As a result, the rear end of the cassette is lifted away from the base 4, and the claw 70 of the spring 59 is also subjected to traction. As soon as the lug 68 is freed from the hook 65, the pre-tensioning of the spring 59 directed towards the left in FIG. 12 acts on the cassette 5 and pushes it out, with the vanes 71 exerting a certain braking effect. In order not to hinder the movements of the spring claw 70, the tongue 67 has a corresponding aperture 75.

What we claim is:

1. A holder for tape cassettes and the like in the form of a rectangular housing which has an entrance along one of its narrow sides for the insertion of the cassette, wherein when a locking means is released, the cassette is moved into a convenient removal position by means of a resilient ejection spring stressed by the insertion movement of the cassette and in which the ejection spring is so constructed and arranged in the housing that on insertion of the cassette the spring automatically locks itself with housing members in a tensioned position.

2. A holder according to claim 1, in which the ejection member consists of a resilient spring of U-shape, the free shank ends of which are fixed to the base in a corner of the housing, and which has an inwardly extending facing section on the shanks adapted to form rests for the cassette when it is inserted, and a releasable locking hook associated with the transverse section of the member on an adjacent housing wall.

3. A holder according to claim 2, in which the locking hook consists of a tongue punched out of the housing wall and formed with an inward-pointing locking lug and a finger grip.

4. A holder according to claim 2 in which the member has a nominal bending point.

5. A holder according to claim 1, characterised by the fact that the ejection spring is of cantilever form fixed to the base by one end in a corner of the housing, and carries on its free end a control section which is movable resiliently at right-angles to the spring and has associated with it on the opposite housing wall a guide by means which the spring is kept tensioned when the cassette is also in the storage position and is releasable for its ejection function by a slight pressure on the cassette.

6. A holder according to claim 5, in which means are provided for holding by friction a cassette when in the housing, the means comprising tongues pressed out of the side walls.

7. A holder according to claim 1, in which the ejection spring is a leaf spring with a central section arched towards the entrance and two symmetrically arranged lateral spring arms extending generally toward the entrance, the housing having tongues extending inwards from the housing base which have at their free ends apertures which have associated with them engaging lugs set out from the leaf spring, the leaf spring has angled sections pointing towards the entrance, and a bridge on the base to curve the central section beyond dead center.

8. A holder according to claim 1, in which the ejection spring consists of a piece of curved spring strip with substantially parallel, but offset shanks, one of the shanks being fixed at one end in the region of the base and the side wall opposite the entrance and the other of the shanks having a resilient lug pointing toward said side wall, and a hook projecting from the side wall and releasably grasping the lug, the end of said other shank being formed into a claw.

9. A holder according to claim 8, in which there are two guide strips on the inside of the base and which have cassette-guiding sections substantially parallel to the base and adjoining wedge sections which taper towards the entrance.

10. A holder according to claims 8, in which adjacent the entrance a corner of the housing is cut away to permit release of the spring locking means by manual pressure on the top corner of the cassette.

11. A cassette holder substantially as herein described with reference to and as illustrated by FIGS. 1 to 4, or FIGS. 5 to 8, or FIGS. 9 to 11 or FIGS. 12 to 14 of the accompanying drawings.

* * * * *

UNITED STATES PATENT OFFICE
CERTIFICATE OF CORRECTION

Patent No. 3,995,921   Dated December 7, 1976

Inventor(s) Peter Ackeret

It is certified that error appears in the above-identified patent and that said Letters Patent are hereby corrected as shown below:

Delete claim 11 in its entirety, and substitute the following:

11. A cassette holder according to claim 1 and there being retaining means anchored to the housing and frictionally and resiliently engaging the inserted cassette and retaining the cassette in the housing until thrust outwardly by the ejection member upon release of the spring.

Signed and Sealed this

Twenty-second Day of February 1977

[SEAL]

Attest:

RUTH C. MASON
Attesting Officer

C. MARSHALL DANN
Commissioner of Patents and Trademarks